US010728244B2

(12) United States Patent
Trani et al.

(10) Patent No.: US 10,728,244 B2
(45) Date of Patent: Jul. 28, 2020

(54) METHOD AND SYSTEM FOR CREDENTIAL MANAGEMENT

(71) Applicant: Sensormatic Electronics, LLC, Boca Raton, FL (US)

(72) Inventors: James Trani, Billerica, MA (US); Walter A. Martin, Ballymena (GB)

(73) Assignee: Sensormatic Electronics, LLC, Boca Raton, FL (US)

( * ) Notice: Subject to any disclaimer, the term of this patent is extended or adjusted under 35 U.S.C. 154(b) by 523 days.

(21) Appl. No.: 15/046,058

(22) Filed: Feb. 17, 2016

(65) Prior Publication Data
US 2016/0241559 A1 Aug. 18, 2016

Related U.S. Application Data

(60) Provisional application No. 62/116,955, filed on Feb. 17, 2015.

(51) Int. Cl.
*G06F 7/04* (2006.01)
*H04L 29/06* (2006.01)
(Continued)

(52) U.S. Cl.
CPC ...... *H04L 63/0876* (2013.01); *G07C 9/00309* (2013.01); *G07C 9/00571* (2013.01);
(Continued)

(58) Field of Classification Search
CPC . H04L 63/0876; H04L 67/00; G07C 9/00309; G07C 2209/08; H04W 12/06; H04W 12/08
See application file for complete search history.

(56) References Cited

U.S. PATENT DOCUMENTS

2012/0115512 A1\* 5/2012 Grainger ............... G01S 5/0257
455/456.3
2013/0217332 A1\* 8/2013 Altman ................. H04H 60/90
455/41.2
(Continued)

FOREIGN PATENT DOCUMENTS

EP 1926263 A2 \* 5/2008 ......... G07C 9/00309

OTHER PUBLICATIONS

International Preliminary Report on Patentability, dated Aug. 31, 2017, from International Application No. PCT/US2016/018276, filed on Feb. 17, 2016. Seven pages.
(Continued)

*Primary Examiner* — Shewaye Gelagay
*Assistant Examiner* — Carlton Johnson
(74) *Attorney, Agent, or Firm* — HoustonHogle LLP (57) ABSTRACT

A security system comprises an access control node broadcasting a beacon including a time stamp and user devices generating replies to the beacon that are based on credential information for the user of the user device and the time stamp. The system relies on the users' wireless-capable mobile computing devices such as smartphones, tablets, or wireless fobs. A credential management system proves a system for the authentication of users and then issues security tokens as credential information to the users' mobile computing devices. These tokens are presented wirelessly by the devices to the security system's access control nodes, for example, where the access control nodes then decide whether to grant or deny access.

17 Claims, 6 Drawing Sheets

(51) Int. Cl.
  *H04W 12/08* (2009.01)
  *H04W 12/06* (2009.01)
  *H04L 29/08* (2006.01)
  *G07C 9/00* (2020.01)
  *H04W 4/00* (2018.01)
(52) U.S. Cl.
  CPC .............. *H04L 67/00* (2013.01); *H04W 4/00* (2013.01); *H04W 12/06* (2013.01); *H04W 12/08* (2013.01); *G07C 2209/08* (2013.01)

(56) References Cited

U.S. PATENT DOCUMENTS

| | | | |
|---|---|---|---|
| 2014/0188348 A1* | 7/2014 | Gautama | B60W 10/30 |
| | | | 701/48 |
| 2014/0222573 A1 | 8/2014 | Middleton et al. | |
| 2014/0292481 A1 | 10/2014 | Dumas et al. | |
| 2015/0025947 A1 | 1/2015 | Dutta et al. | |

OTHER PUBLICATIONS

International Search Report and Written Opinion of the International Searching Authority, dated Jun. 7, 2016, from International Application No. PCT/US2016/018276, filed on Feb. 17, 2016. Eleven pages.

\* cited by examiner

METHOD AND SYSTEM FOR CREDENTIAL MANAGEMENT

RELATED APPLICATIONS

This application claims the benefit under 35 USC 119(e) of U.S. Provisional Application No. 62/116,955, filed on Feb. 17, 2015, which is incorporated herein by reference in its entirety.

BACKGROUND OF THE INVENTION

Security systems are often installed within and around buildings such as commercial, residential, or governmental buildings. Examples of these buildings include offices, hospitals, warehouses, schools or universities, shopping malls, government offices, and casinos. The security systems typically include components such as system controllers, access control systems, surveillance cameras, image analytics systems, and/or network video recorders (NVRs), to list a few examples.

The access control systems in buildings, for example, are principally concerned with physical security and the selective access to, restriction of, and/or notification of access to a place or other resource. Historically, the main components of the access control systems were system controller, access control readers, and possibly door controllers. The access control readers were often installed to enable presentation of credentials to obtain access to restricted areas, such as buildings or areas of the buildings. The readers were installed near the access points, such as doors or hallways or elevators. Typically, individuals would interact with the access control readers by swiping keycards or bringing contactless smart cards within range of the reader. The access control readers would read the credential information of the keycards and validate the information possibly by reference to a verification system that confirmed the credentials and determined if the individuals were authorized to access the restricted areas. If the individuals were authorized, then the access control readers might signal the door controllers to unlock doors or not generate alarms, for example.

SUMMARY OF THE INVENTION

Newer access control systems use wireless technology that enables a more transparent method for identifying and tracking users while providing similar access control and tracking as traditional systems and methods. They rely on the users' wireless-capable mobile computing devices such as smartphones, tablets, or wireless fobs. A credential management system proves a system for the authentication of users and then issues security tokens to the users' mobile computing devices. These tokens are presented wirelessly by the devices to security system's access control nodes, for example, which nodes then decide whether to grant or deny access.

An issue that arises is how the nodes and user devices should exchange information. The approach should be robust against attempts to hack the system but should also conserve the power required especially for the user devices, which are often battery-powered.

In general according to one aspect, the invention features a security system. This system comprises an access control node broadcasting a beacon including a time stamp and user devices generating replies to the beacon. Each reply is based on credential information for the user of the user device and the time stamp.

In embodiments, the beacon further includes a node identification for the node, and the beacon is broadcast as a Bluetooth low energy transmission.

Preferably, the access control node only processes the replies from user devices received within a predetermined time. This time is typically less than 1 second or about 500 milliseconds, or less. The access control node places these replies in a queue for processing. On the other hand, the user devices reply to the beacon after a variable time delay to avoid collisions.

In the current embodiment, the replies of the user devices comprise user identifiers for the users of the devices and device identifiers for the user devices.

In the illustrated example, the credential information is issued by a third party authentication system server.

In general according to another one aspect, the invention features an access control method for a security system. This method comprises broadcasting a beacon including a time stamp at an access control node and receiving replies to the beacon based on the time stamp, the replies including credential information of users of the user devices.

The above and other features of the invention including various novel details of construction and combinations of parts, and other advantages, will now be more particularly described with reference to the accompanying drawings and pointed out in any claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms including the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
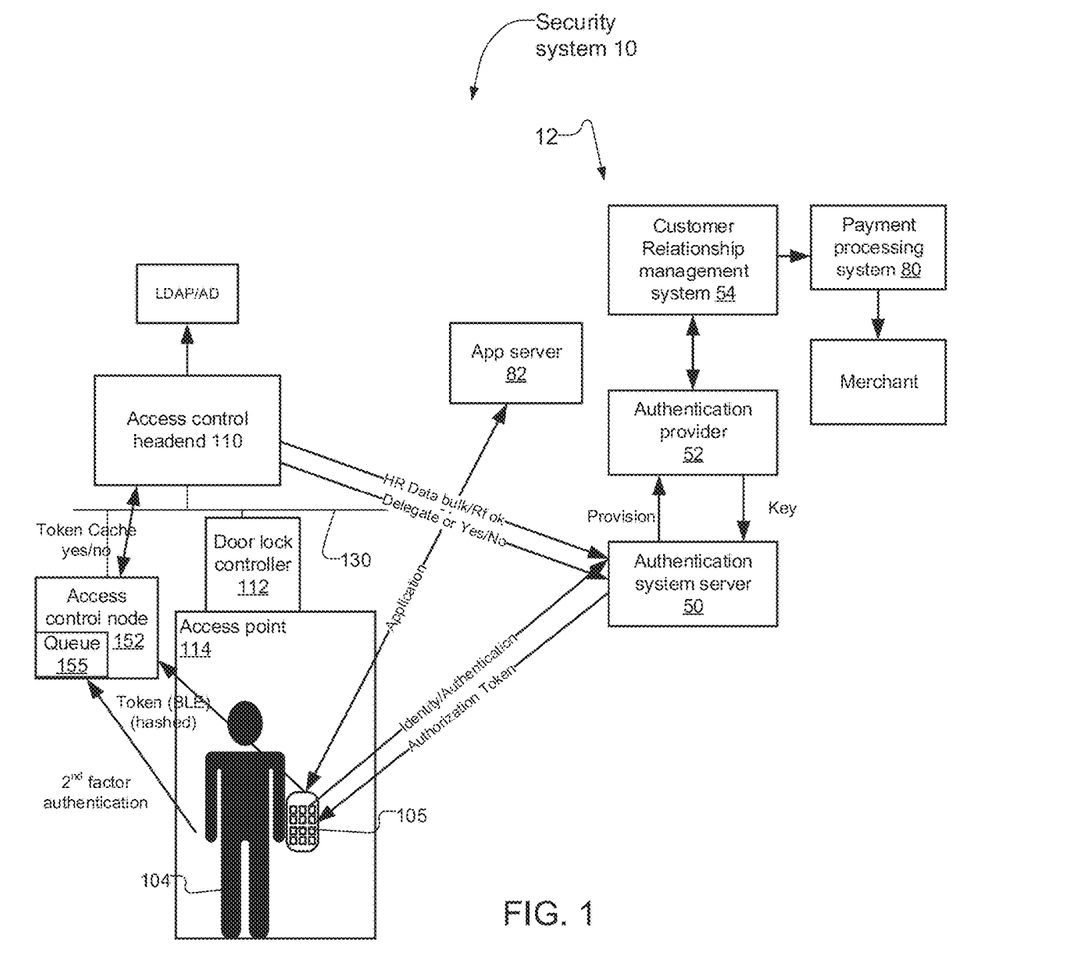
FIG. 1 is a block diagram of a security system with a security credential management system according to the present invention.

FIG. 1 shows a security system 10 with a credential management system 12 that has been constructed according to the principles of the present invention.

It illustrates how the user's mobile computing device 105 accesses the application or app that was purchased and/or downloaded from internet app server 82, typically. Examples include the app store provided by Apple Corporation or Google Pay provided by Google Inc., for example, or other application program source.

This app executes on the mobile computing device 105 and allows the user 104 to provide identity and authentication information to an authentication system server 50 of the credential management system 12 that is accessed via the device app in one example.

The authentication system server 50 requests authentication tokens and other provisioned information from the authentication provider server 52. Authentication tokens along with the key are provided by the authentication provider server 52 back to the authentication system server 50.

The tokens or representations of the tokens and keys are then distributed such as via an authentication control headend server 110. It communicates with the various access control nodes 152, such as card or frictionless Bluetooth low energy (BLE) or near field readers, and door controllers 112. These nodes 152 and/or door controller 112 readers are usually dispersed around the company's buildings and typically installed in connection with the various access points 114, such as doors, elevators, rooms, hallways, to list a few examples. The access control headend server 110 stores caches of the tokens.

The authentication provider that operates the authentication provider server 52 is paid for the tokens it distributes and its authentication functions via a payment processing system 80 since it is a third party company, in one example. A customer resource management system 54 is used to control the interface with the payment processing system 80.

In general, some of the basic features of the present system 10 involve card emulation by the users' mobile computing devices 105. This enables virtual credentialing of the users 104. In operation, the organization operating the security system 10 will buy a pool of credentials from the authentication provider that operates the provider server 52. Such a provider will typically have provided the application programs to the users for execution on their individual mobile computing devices 105 via the app server 82. These application programs will enable the users 104 to be authenticated in some examples and obtain and manage credentials that are issued to the users and stored on the users' devices, such as security tokens.

The issued security tokens are usually time-limited, i.e., expire after a certain period of time or at a particular date and time. If the users are still validated, then new tokens will be issued as part of a rotation.

In operation, these credential information (i.e., tokens or representations of the tokens (token hashes)) are issued to the users' devices 105 and then sent wirelessly by the devices to access control nodes 152, managing access to a door, elevator or other entry point or node 114. The security system 10 of the access control system will then validate the credential information (tokens and then determine the credentials, authenticated identification associated with the token. The devices' tokens are stored in a queue 155 of the nodes and then processed and passed through the system and matched with the credentials.

The credential management system 12 of the security system 10 allows customer organizations to securely purchase, enroll, and download credentials to mobile devices 105 of their users as well as import credentials to the access control system headend server 110 of the security system 10.

The basic system can support major web browsers (Internet Explorer, FireFox . . . ) and securely interfaces to payment systems 80 such as the PayPal payment system. Authentication and SSL interfaces are used for the enrollment pages and the system provides different roles and level of user privileges. The apps/application programs that run on the user devices 105 are compatible with major smart phone (mobile computing device) brands (Apple iPhones (iOS), BlackBerry, Android-based operating systems and other mobile computing device (smart phones) operating systems to enroll credentials to the users' mobile devices.

The credential management system 12 provides an abstraction layer and plugins for each access control interface from different vendors. It preferably supports credential management including features such as enroll, modify, delete, query, and report. The credential management system also functions to support business unit enrollment services, pre-enrollment services, mobile device application enrollment services, individual device enrollment services, mobile device application device verification, and reader/control panel device/credential verification.

The credential management system addresses various security considerations such as data confidentiality and integrity (addressing Man-in-the-Middle attacks), Data availability (addressing Denial-of-Service attacks), and Authentication (addressing password crack attacks).

Figure 2:
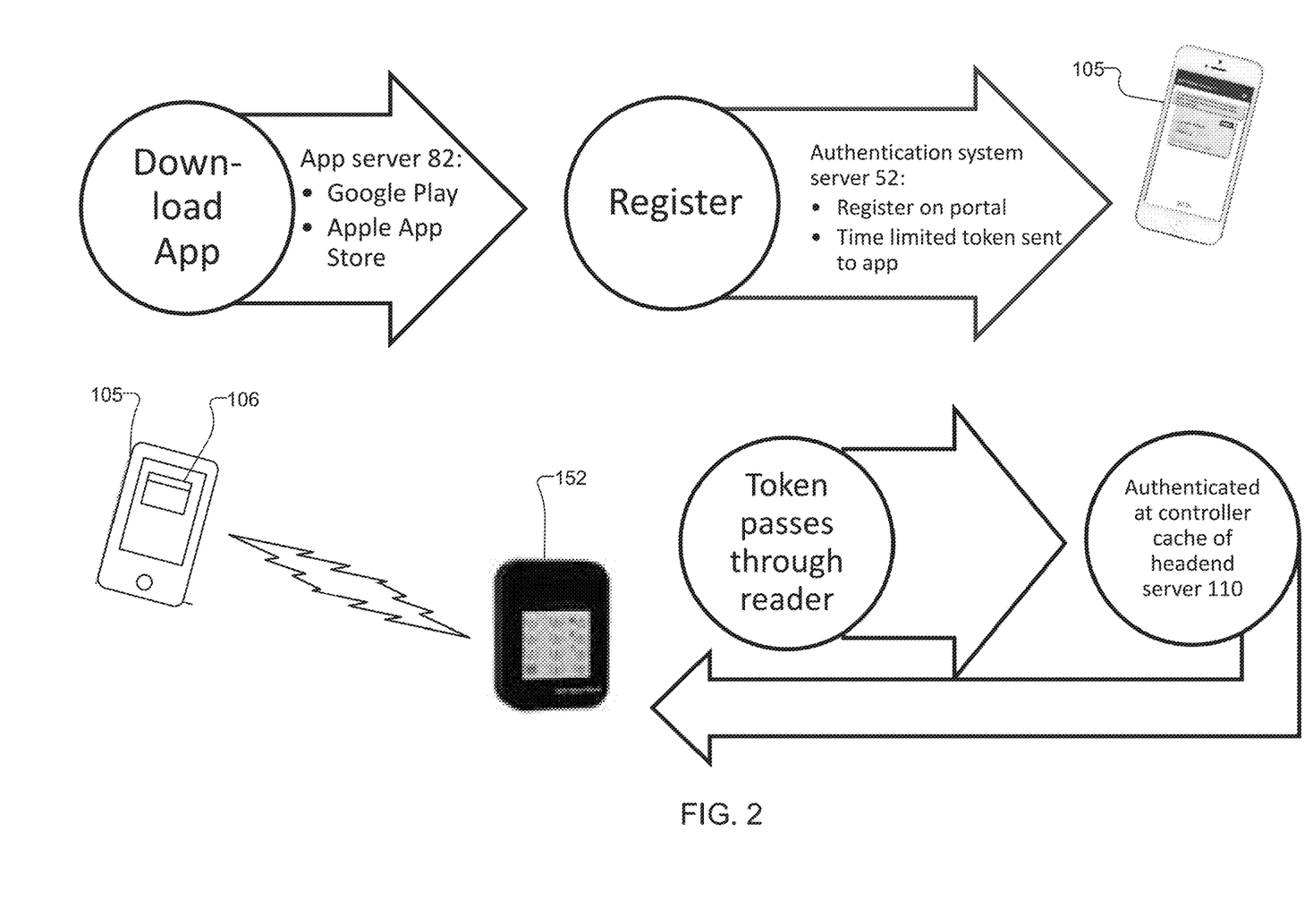
FIG. 2 is a schematic diagram showing how security tokens are obtained and then used by the user's mobile computing device (smartphone)

FIG. 2 provides an overview of the user experience showing how user credentials including security tokens are Obtained and then used by the user's mobile computing device (smartphone) 105. It illustrates how the app 106 on the user's device 105 can be downloaded via from the app server 82. The user then registers via this app with a portal that is hosted on the authentication system server 50 that is owned and managed by the authentication provider.

During operation, the user device 105 passes the authentication tokens through Bluetooth or NFC (nearfield communication) protocols, for example, to the access control node 152. These tokens are then authenticated against the tokens stored in the cache on the node 152 and/or the access control headend server 110. The server 110 or the node 152, depending, on the implementation, then signal the door lock controller 112, for example, to grant the user 104 access, or not.

Figure 3:
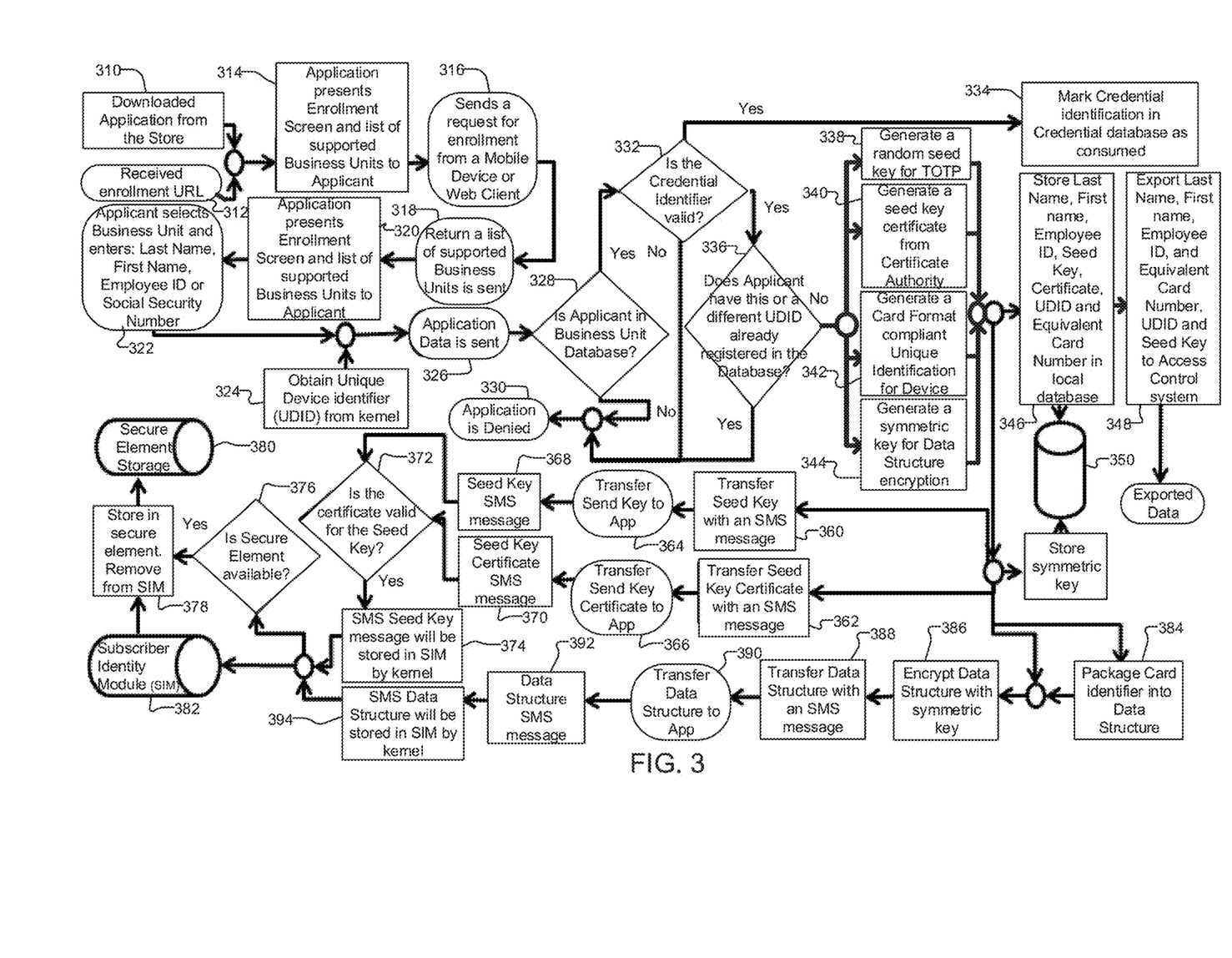
FIG. 3 is a flow diagram illustrating the operation of the security credential management system in conjunction with the user's mobile computing device describing the creation and distribution of credential information.

FIG. 3 shows the creation and distribution of credential information for users and their devices.

This figure shows how the user device app is downloaded in step 310 and installed on the user's mobile device 105. This app has or accesses the enrollment URL in step 312. This leads the user to the enrollment screen that is rendered on the display of the user device 105 in step 314. The app sends a request for enrollment from the user device 105 in step 316. A standard web client such as a browser can also be used. A list of supported business units is returned by the authentication provider in step 318. This information is provided on the display of the user device in step 320. The user will then select their business unit and enter personal information such as name, employee ID number and possibly social security number in step 322.

The app then obtains the unique device identifier (UDID) for the user's device in step 324. This is usually available to the device's operating system kernel.

The user/applicant's data along with the device's identifying information is then sent to the authentication provider server 52, in step 326. The authentication provider server 52 then confirms that the user is a valid employee of the identified business unit in step 328.

If the user is determined to not be a valid applicant, then the user's application is denied in step 330.

The credential identifier is determined to be valid or not in step 332. If not valid the application is also denied in step 330 again. If it is valid, then the credential identification is marked as consumed in step 334 in the credential database of the authentication provider server 52.

Additionally, if the credential identifier is valid, it is determined whether the user's device 105 has been previously associated with the credential or the device is new by reference to the UDID in step 336.

If the user applicant has had no previous device registered, then a random seed key is generated in step 338, a random seed key certificate is generated in step 340, a card format compliant unique identifier in step 342 is generated for the device 105, and a symmetric key for data structure encryption is generated in step 344.

The employee data are stored along with the seed key, certificate, UDID and equivalent card number in the local database 350 of the authentication provider server 52 in step 346. The information is also exported to the access control system and specifically to the system's headend server 110 in step 348.

Additionally, data are exported back to the app executing on the user device 105 for storage in the data structure of the app. This information is sent for storage back to the app and encrypted with the symmetric key. It can be transferred in one example via an SMS message.

The transfer seed key is also sent. The transfer seed key certificate is also sent via SMS message in one example.

In more detail, the authentication provider server 52 transfers the seed key and the seed key certificate in one or two SMS messages to the user devices in steps 360, 362. These are received in the user devices 105 and then transferred from the messaging app of the device 105 to the security app in steps 364, 366. The app then incorporates the seed key and the seed key certificate in steps 368, 370.

The user device then determines if the certificate is valid for the seed key in step 372. If it is valid then the seed key is stored in the device's SIM card 382 by the device's operating system in step 374, otherwise an error is registered. The data structure is also preferably stored to the SIM card 382.

A data structure is created from the package card identifier in step 384. This data structure is encrypted in step 386 and transferred to the user device 105 in step 388, such as by an SMS message. In step 390 and 392, the data structure is transferred and incorporated into the security app. The data structure is then stored into the SIM card 382 in step 394.

In the case where the user device has a secure element storage 380 as determined in step 376, the information is removed from the SIM card 382 and transferred to the secure element storage 380 in step 378.

Figure 4:
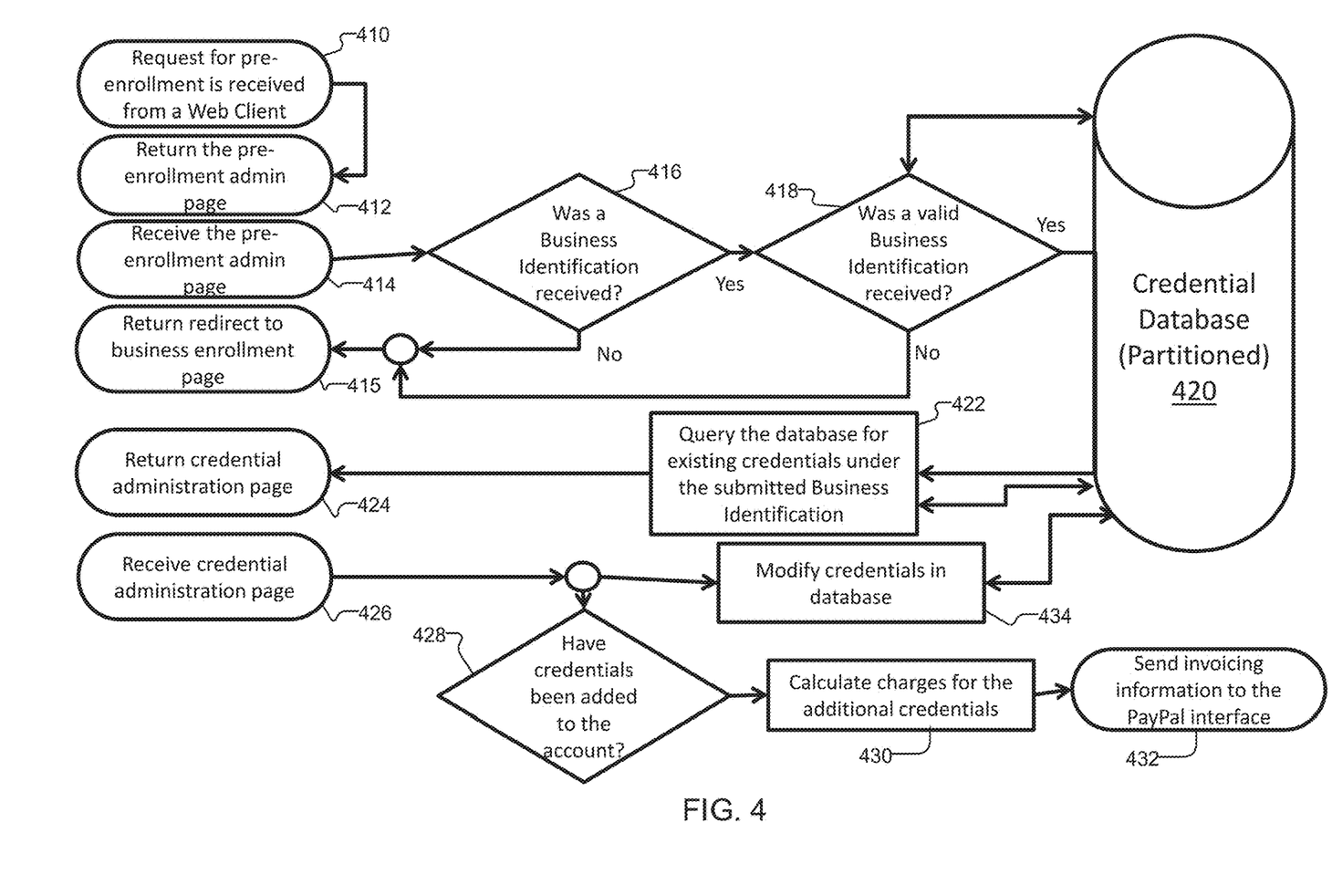
FIG. 4 is a flow diagram showing the pre-enrollment service for the credential management system for the creation of credential information.

FIG. 4 shows the pre-enrollment service for the credential management system 12. The security app executing on the user device 105 accesses the authentication system server credential management system in step 410, which returns the pre-enrollment web page in step 412.

User entered data is received by the credential management system in step 414. The authentication provider server 50 confirms whether the business was identified in step 416 and that it is a valid business unit in step 418. This check is performed by reference to the business unit database stored in the credential database 420.

If the business was not identified, then a business enrollment page is provided in step 415.

If the business was identified then the database is queried for the existing credentials in step 422. The credential administration page is returned in step 424. User entered data is received in step 426. If credentials are added as determined in step 428, then charges are calculated in step 430 and invoices issued in step 432.

Additional credentials can also be purchased, if necessary.

Figure 5:
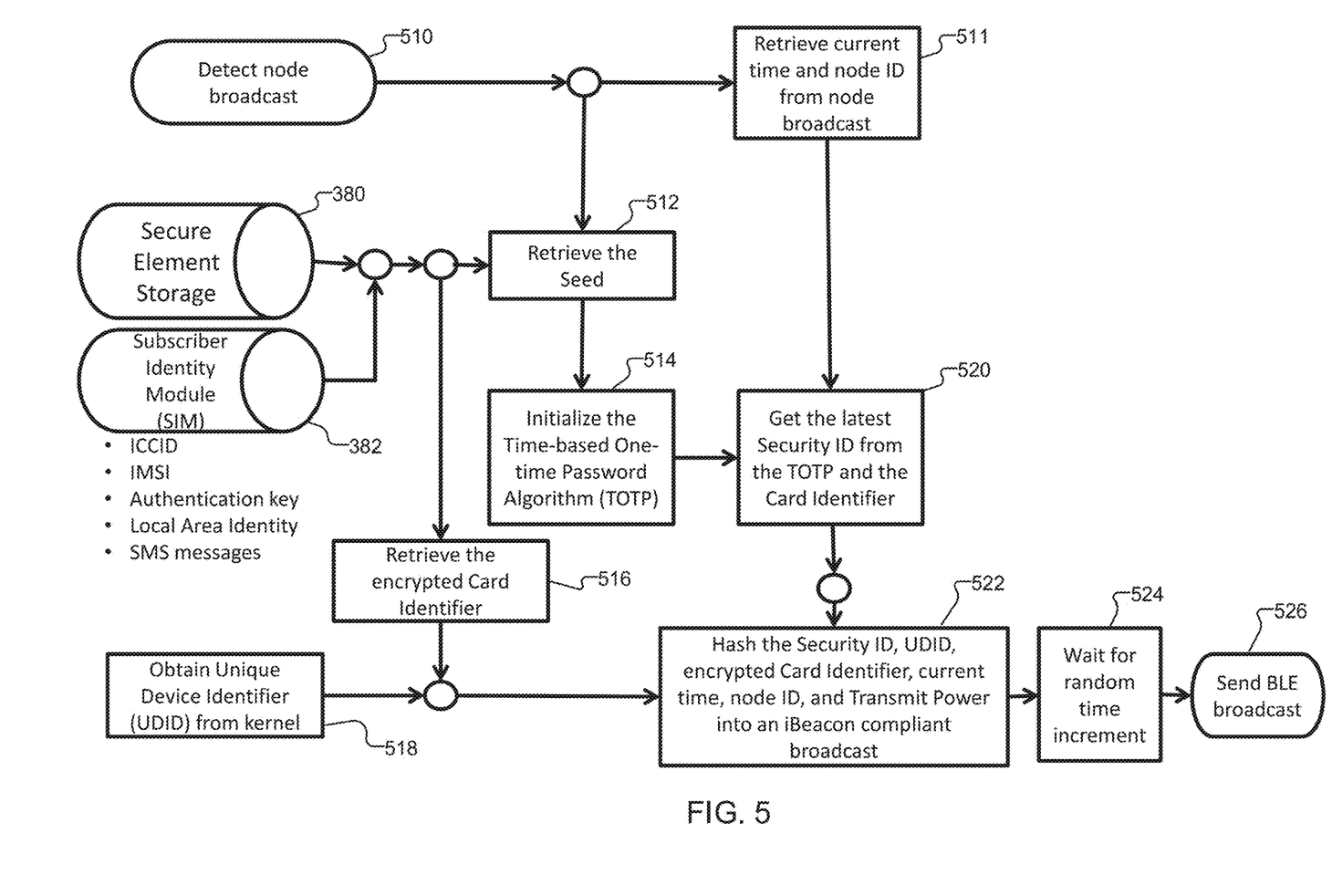
FIG. 5 is a flow diagram showing the mobile device application verification process for the credential management system in the access control method.

FIG. 5 shows the mobile device verification by the credential Management System. This process is performed by the user device 105 when it is in proximity to an access control node 152.

The process starts when a broadcast is detected from the access control node 152 in step 510. This broadcast includes a nodeID, which is a unique identification assigned to each access control node 152. The broadcast also includes the current time as a time stamp. The current time and the nodeID are retrieved from the broadcast in step 511. In one embodiment, this time is the least significant bytes of the current time.

In step 512, the security app executing on the device 105 retrieves the seed key either from the secure element storage 380 or the subscriber identity module (SIM) card 382. This seed key is then used to initialize the time based one-time password algorithm (TOTP) in step 514. The encrypted card identifier is also retrieved in step 516. This is combined with the UDID from the kernel, which is retrieved in step 518.

The latest security ID from the TOTP and the card identifier are obtained in step 520. In step 522, a hash is created from the security ID, UDID, the encrypted card identifier, the nodeID and the current time from the node. This is combined into an iBeacon compliant broadcast, in one implementation. This is transmitted to the access control system node 152 via a NFC, Bluetooth low energy transmission (BLE) or WiFi, for example. This broadcast occurs in step 526 after a random wait time that is implemented in step 524. This delay in for the wait time period avoids collisions with other devices.

Figure 6:
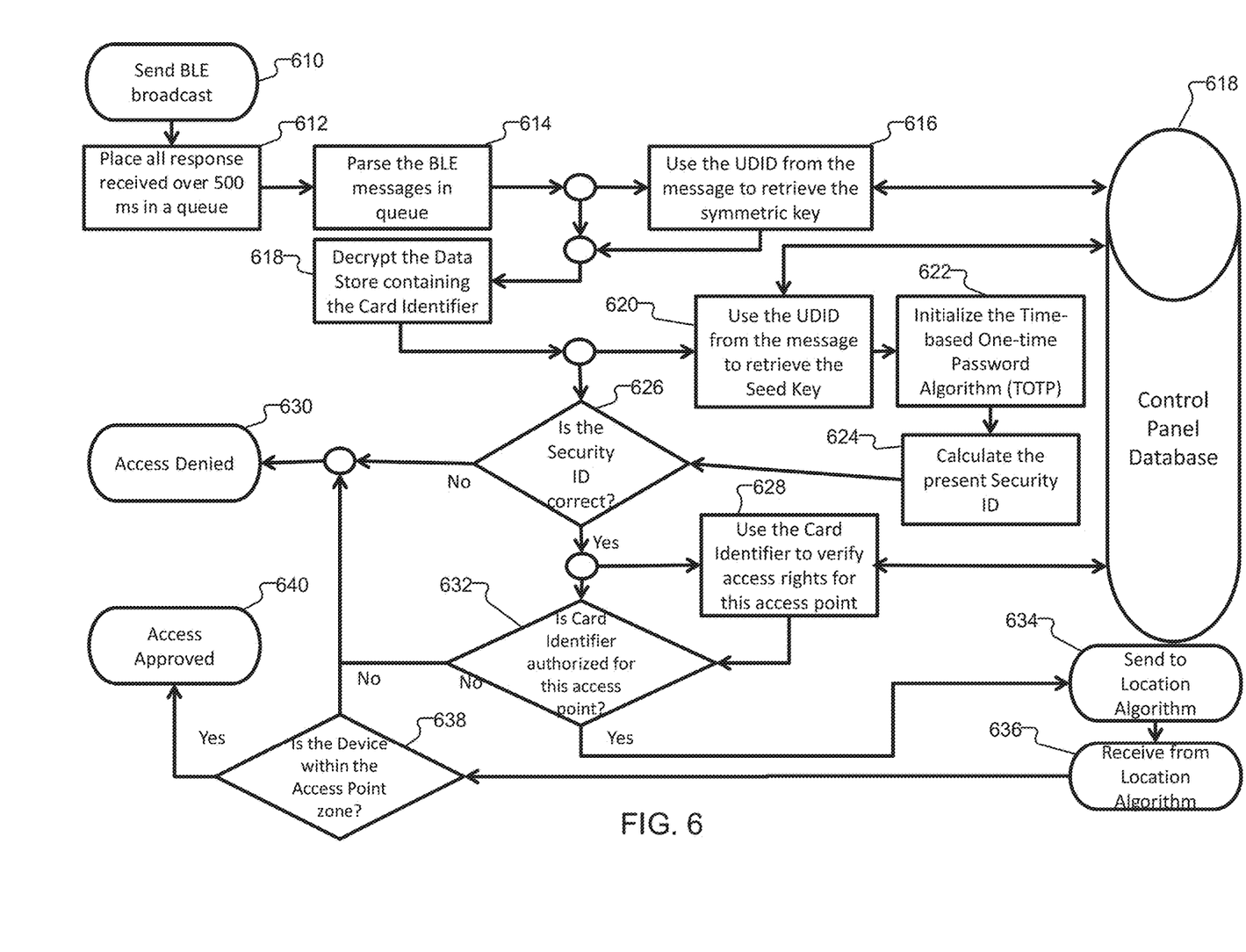
FIG. 6 is a flow diagram showing the reader/control panel device credential verification process for the credential management system in the access control method.

FIG. 6 shows the credential verification performed by the access control node 152 of the security system.

The access control node or reader sends BLE broadcast including the node's nodeID and the current time (least two significant bytes) in step 610.

The responsive BLE broadcasts from the user devices are then received and placed into the queue 155 in step 612. In one example, responses to the BLE broadcast that are received within less than 1 second or about 500 milliseconds or less are placed the queue.

Using the time contained in node's broadcast and the nodes's nodeID, the security ID, UDID, encrypted card identifier are retrieved from the device broadcast by parsing each device broadcast in step 614.

The node 152 uses the device's UDID to retrieve the symmetric key in step 616 from the node's database 618. These credentials can also be requested from the access control headend 110 if they are not present in the cache in the database 618 or the versions in the caches are stale. The retrieved symmetric key is used to decrypt the data store containing the Card Identifier in step 618.

Using the seed key for the UDID of the message in step 620, the TOTP algorithm is initialized in step 622. The present Security ID is calculated in step 624. The access control node determines whether the security ID is correct in step 626. If it is not correct then access is denied.

If the security ID is correct then the card identifier is used to verify the associated user has access rights for this access point or door for example in step 628.

If there is no access tight for the user as determined in step 632, access is denied in step 630.

If there are sufficient access rights as determined in step 632, then the location of the device is assessed in steps 634, 636, and 638.

Before access is granted, the location of e device 105 is also determined in some examples as shown in steps 634, 636. Access is only granted if the device 105 is determined to be adequately close to the access point 152 in step 638. That is, the door, for example, should only be opened when the user is in front of the door.

Different methods can be used to determine position. Bluetooth is a wireless technology that operates in a 2.4 GHz (gigahertz) short-range radio frequency band. In free space, Bluetooth applications typically locate a Bluetooth device by calculating the distance of the user devices from the signal receivers. The distance of the device from the receiver is closely related to the strength of the signal received from the device. A lower power version of standard Bluetooth called Bluetooth Low Energy (BLE), in contrast, consumes between ½ and 1/100 the power of classic Bluetooth. BLE is optimized for devices requiring maximum battery life instead of higher data transfer rates associated with classic Bluetooth. BLE has a typical broadcast range of about 100-150 feet (approximately 35-46 meters).

In an alternative implementation, the user devices are capable of broadcasting via standard Bluetooth. In still other alternative implementations, the user devices may broadcast via other wireless technologies such as Wi-Fi (IEEE 802.11), active RFID (radio frequency identification), or ZigBee, to list a few examples.

The positioning units are provided as part of the access control nodes, in some examples, each preferably includes two or more antennas. The positioning units determine locations of the user devices using one or more positioning techniques.

A preferred positioning technique compares signal attenuation between two antennas of the positioning unit. Another positioning technique includes determining time of flight of packet data received at each of the antennas of a positioning unit. In yet another positioning technique example, the positioning units employ triangulation between two or more positioning units installed within the building.

In any event, if the device is determined to be adequately close in step 638, then access is approved in step 640. Otherwise access is again denied in step 630.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security system comprising:
an access control node broadcasting a beacon including a time stamp, wherein the access control node manages access to an access point, wherein the beacon is broadcast as a Bluetooth transmission; and
smartphone user devices receiving the broadcast of the beacon and generating replies to the beacon that are based on credential information for the user of the user device and the time stamp, and enabling virtual credentialing of users with tokens obtained from a pool of credentials, wherein issued security tokens expire after a certain period of time, and wherein if a user is still validated, then new tokens are issued as part of a rotation, and
wherein the replies are transmitted as a Bluetooth transmission after a random wait time from receipt of the broadcast of the beacon;
wherein the access control node only processes the replies from the user devices received within a predetermined time and includes at least one antenna for receiving the replies from the smartphone user devices to determine positions of the smartphone user devices relative to the access point.

2. A security system as claimed in claim 1, wherein the beacon further includes a node identification for the node.

3. A security system as claimed in claim 1, wherein the beacon is broadcast as a Bluetooth low energy transmission.

4. A security system as claimed in claim 1, wherein the predetermined time is less than 1 second or about 500 milliseconds.

5. A security system as claimed in claim 1, wherein the replies of the user devices comprise user identifiers for the users of the devices and device identifiers for the user devices.

6. A security system as claimed in claim 1, wherein the credential information is issued by a third party authentication system server.

7. A security system as claimed in claim 1, wherein the access control node receives the replies from the user devices and places the replies in a queue for processing.

8. An access control method for a security system, comprising:
broadcasting a beacon including a time stamp at an access control node using Bluetooth transmission, wherein the access control node manages access to an access point; and
receiving replies to the beacon based on the time stamp, wherein the replies are transmitted as a Bluetooth transmission after a random wait time from receipt of the broadcast of the beacon, the replies including credential information of users of smartphone user devices, and enabling virtual credentialing of users with tokens obtained from a pool of credentials, wherein issued security tokens expire after a certain period of time, and wherein if a user is still validated, then new tokens are issued as part of a rotation, and wherein the access control node includes at least one antenna for receiving the replies from the smartphone user devices to determine positions of the smartphone user devices relative to the access point; and the access control node only processing the replies from the user devices received within a predetermined time.

9. A method as claimed in claim 8, wherein the beacon further includes a node identification for the node.

10. A method as claimed in claim 8, further comprising broadcasting the beacon using Bluetooth low energy transmission protocol.

11. A method as claimed in claim 8, wherein the predetermined time is less than 1 second.

12. A method as claimed in claim 8, wherein the replies of the user devices comprise user identifiers for the users of the devices and device identifiers for the user devices.

13. A method as claimed in claim 8, further comprising issuing the credential information from a third party authentication system server.

14. A method as claimed in claim 8, further comprising placing the replies from the user devices in a queue for processing.

15. An access control method for a security system, comprising:

broadcasting a beacon including a time stamp and a node identification at an access control node using Bluetooth transmission, wherein the access control node manages access to an access point;

receiving replies to the beacon based on the time stamp, wherein the replies are transmitted as a Bluetooth transmission, the replies including credential information of users of smartphone user devices and being transmitted after a random wait time from receipt of the broadcast of the beacon, and enabling virtual credentialing of users with tokens obtained from a pool of credentials, wherein issued security tokens expire after a certain period of time, and wherein if a user is still validated, then new tokens are issued as part of a rotation, and wherein the access control node includes at least one antenna for receiving the replies from the smartphone user devices to determine positions of the smartphone user devices relative to the access point;

only placing the replies in a queue that are received within less than 1 second;

retrieving encrypted card identifiers from the replies;

requesting the decryption key from an access control headend;

decrypting the card identifiers using the decryption keys and determining if there are access rights for the users for the access point;

if there are access rights, determining a location of the smartphone user devices; and only granting access if the smartphone user devices are determined to be adequately close to the access point.

16. A method as claimed in claim 15, wherein determining the location of the smartphone user devices includes determining a signal strength of replies from the smartphone user devices.

17. A method as claimed in claim 15, wherein determining the location of the smartphone user devices includes determining a time of flight of packet data received at each antenna of the access control node.

* * * * *